US009550418B1

(12) United States Patent
Logan et al.

(10) Patent No.: US 9,550,418 B1
(45) Date of Patent: *Jan. 24, 2017

(54) TRAVEL SAFETY CONTROL

(71) Applicant: Twin Harbor Labs, LLC, Plano, TX (US)

(72) Inventors: James D Logan, Candia, NH (US); Paul Hammerstrom, Milford, NH (US); Richard A Baker, Jr., West Newbury, MA (US)

(73) Assignee: Twin Harbor Labs, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,469

(22) Filed: Jul. 22, 2016

Related U.S. Application Data

(63) Continuation-in-part of application No. 14/982,217, filed on Dec. 29, 2015, now Pat. No. 9,399,398.

(60) Provisional application No. 62/170,668, filed on Jun. 3, 2014.

(51) Int. Cl.
*B60L 9/00* (2006.01)
*B60K 28/10* (2006.01)

(52) U.S. Cl.
CPC ............ *B60K 28/10* (2013.01); *B60Y 2200/12* (2013.01); *B60Y 2200/20* (2013.01); *B60Y 2300/188* (2013.01)

(58) Field of Classification Search
CPC ... B60K 31/00; B60K 2031/0091; B60L 3/08; H04W 4/008
USPC ....................... 701/22; 307/9.1; 320/108, 149
See application file for complete search history.

(56) References Cited

U.S. PATENT DOCUMENTS

| | | | |
|---|---|---|---|
| 5,315,289 A | 5/1994 | Fuller et al. | |
| 7,936,094 B2 | 5/2011 | Rossi et al. | |
| 8,326,443 B2 | 12/2012 | Nelson et al. | |
| 8,456,308 B2 | 6/2013 | Nelson et al. | |
| 8,514,085 B2 | 8/2013 | Nelson et al. | |
| 9,399,398 B1 * | 7/2016 | Logan .................. | B60K 31/00 |
| 2012/0188083 A1 | 7/2012 | Miller | |
| 2012/0210498 A1 | 8/2012 | Mack | |
| 2012/0265477 A1 | 10/2012 | Vock | |

(Continued)

FOREIGN PATENT DOCUMENTS

| | | |
|---|---|---|
| CN | 203399732 U | 1/2014 |
| CN | 203996579 U | 12/2014 |

(Continued)

OTHER PUBLICATIONS

Hashim, Faezah Binti, "Intelligent Safety Helmet for Motorcyclist", Project report for Bachelors Degree in Electrical Engineering at the Universiti Teknikal Malaysia Melaka, Apr. 2011.

(Continued)

*Primary Examiner* — Gertrude Arthur Jeanglaud
(74) *Attorney, Agent, or Firm* — Richard A. Baker

(57) ABSTRACT

A system and method for encouraging a user of a recreational vehicle to wear safety equipment is described. The helmet contains a microprocessor and sensors to determine if the helmet is worn. The helmet communicates with the vehicle and the vehicle either disables operation or allows limited operation if the helmet is not worn. On motorized vehicles, the motor operation is restricted. On human powered vehicles mechanical resistance may limit operation.

20 Claims, 8 Drawing Sheets

(56) References Cited

U.S. PATENT DOCUMENTS

| | | |
|---|---|---|
| 2012/0326837 A1 | 12/2012 | Ajay et al. |
| 2013/0041525 A1 | 2/2013 | Tomberlin |
| 2013/0063268 A1 | 3/2013 | Golomb |
| 2013/0093585 A1 | 4/2013 | Ambani |
| 2013/0103416 A1 | 4/2013 | Amico |

FOREIGN PATENT DOCUMENTS

| | | |
|---|---|---|
| EP | 0346300 A1 | 12/1989 |
| EP | 1590230 B1 | 11/2006 |
| IN | 607/MUM/2012 | 12/2013 |
| KR | 101385146 B1 | 4/2014 |

OTHER PUBLICATIONS

Yusof, Mohammed Syahid Nafi' bin Mohd, "Smart Helmet", Project report for Bachelors Degree in Technology at the Universiti Teknologi Petronas, Jan. 2009.

Choubey, Praduman, "Helmet-less? Beware of vehicle nanny-BIT-Sindri team rolls out ATV with sensor alarm on lines of smartphone technology", The Telegraph of Calcutta, India, Feb. 16, 2015.

Rasli, Mohd, "Smart helmet with sensors for accident prevention", IEEE International Conference on Electrical, Electronics and System Engineering (ICEESE), Dec. 4-5, 2013.

Singh, Dushyant, "The Smart Helmet", LinkedIn SlideShare found at http://www.slideshare.net/Dushyant0027/the-smart-helmet, dated Jul. 22, 2014.

AbsintheWithoutLeave, "Bicycle helmet brake interlock", Halfbakery Blog, dated Dec. 28, 2007, found at http://www.halfbakery.com/Ir/idea/Bicycle_20helmet_20brake_20interlock.

Blain, Loz, "Review: Sena's SMH10 universal Bluetooth helmet intercom", Gizmag, Dec. 2, 2012, found at http://www.gizmag.com/sena-smh10-bluetooth-intercom-stereo-review/25269/.

Manjesh, N, et al, "Smart Helmet Using GSM &GPS Technology for Accident Detection and Reporting System", International Journal for Electrical and Electronics Research, vol. 2, Issue 4, p. 122-127, Oct.-Dec. 2014.

Das, Amitava, et al, "Smart Helmet for Indian Bike Riders", International Journal of Advances in Science Engineering and Technology, ISSN: 2321-9009 vol. 2, Issue-4, Oct. 2014.

\* cited by examiner

TRAVEL SAFETY CONTROL

RELATED APPLICATIONS

This patent application is a continuation-in-part of U.S. patent application Ser. No. 14/982,217, entitled Travel Safety Control, now U.S. Pat. No. 9,399,398, incorporated herein by reference. U.S. patent application Ser. No. 14/982,217 is a non-provisional application of, and claims the benefit of the filing dates of, U.S. Provisional Patent No. 62/170,668 filed on Jun. 3, 2015 entitled Travel Safety Control. The disclosures of this provisional patent application is incorporated herein by reference.

BACKGROUND OF INVENTION

Field of the Invention

The present invention is directed to recreational vehicles, in particular the communications between a recreational vehicle and safety equipment.

Description of the Related Art

Many people use human powered or recreational vehicles such as ATVs (all-terrain vehicles), on and off road motorcycles, UTVs (utility task vehicle), snowmobiles, bicycles, kayaks, motor boats, tractors, go carts, lawn tractors, dune buggies, golf carts, skateboards, scooters, self-balancing devices (Segway, RYNO, UNI-Cub, hoverboards and similar devices), skis, etc. It is much safer to operate these vehicles with safety equipment such as a helmet, a life jacket or similar device. This invention provides a means for encouraging the use of these safety devices by the users of the vehicles by limiting the functionality of the vehicle if the safety equipment is not worn. Simply disabling the vehicle when a helmet is missing was considered, but deemed to be undesirable and perhaps dangerous to the user. If a helmet is lost by the user many miles into the woods, the user's survival may be in peril if the user cannot get the vehicle to return him home. So the present invention limits functionality and performance while still allowing the user to return home.

Other systems have used interlocks to prevent the vehicle from starting, but these other systems allow the user to easily defeat the system or use a lot of power to operate. For instance, Piero Bossi's European Patent application EP 0346300A1 teaches the disabling of a moped when a helmet is not present. Similarly, Hong-Woo Lee and Kim Duck-soo teach an interlock device that prevents the starting of a motorcycle when the helmet is not present in Korean patent KR 101385146. However, each of these teachings fail to account for many aspects of the present invention, for instance neither allow the vehicle to operate when the helmet is missing, potentially creating a safety issue if the helmet is lost when deep in the woods.

BRIEF SUMMARY OF THE INVENTION

This invention utilizes Bluetooth or Bluetooth Low Energy (BLE) as a method of communication between sensors in a helmet and sensors on a vehicle. The helmet has a combination of accelerometers, optical sensors, and capacitance sensors placed in strategic locations. The helmet can also have a unique identifying code. The information from these sensors are sent wirelessly to a central processing unit that reads the helmet data.

There are also sensors placed on the vehicle, such as accelerometers, rpm sensors, and temperature sensors. The vehicle sensors could also utilize a smartphone which has some of these sensors embedded within the phone itself. The vehicle sensors are also sent wirelessly to a central processing unit that reads the vehicle sensor data.

The unit then uses programmed in logic to determine if the helmet is on the user, the user is on the vehicle and the vehicle is in motion. If the unit determines the user is not wearing a helmet and the vehicle is in motion, it will send signals to prevent the vehicle from operating properly.

In the case where a helmet is not being worn, the central processing unit sends signals to interrupt the vehicles ignition, fuel delivery, or in the case of a human powered vehicle, switches on or off an electromechanical process to prevent proper vehicle use.

A safety device for a recreational vehicle, for instance a motorcycle or an all-terrain vehicle, that is made up of a motor for propelling the recreational vehicle forward, a power limiting device connected to the motor, where the power limiting device limits speed of the motor, but does not stop the motor, one or more sensors for monitoring operation of the recreational vehicle and a processor connected to the one or more sensors and to the power limiting device, the processor configured to disable the power limiting device when data from the one or more sensors indicates the recreational vehicle is not in an unsafe operation. The sensors could include one or more accelerometers for checking to see if the vehicle is upright, operated at a reasonable speed, or on smooth terrain. The sensors could include one or more location or global positioning sensors indicating operation of the recreational vehicle within a specified area. The sensors could include one or more communications interfaces connected to the processor for wirelessly detecting the presence of a cellular phone.

A method for limiting the functionality of a recreational vehicle, such as a motorcycle or an all-terrain vehicle, when operated unsafely which include the steps of limiting the functionality of the recreational vehicle by activating a power limiting feature connected to a motor that is used to propel the recreational vehicle forward, where the power limiting feature limits speed of the motor, but does not stop the motor, monitoring the operation of the recreational vehicle by reading data from one or more sensors, converting data into a signal to the power limiting feature on the motor and disabling the power limiting feature of the motor when the signal is received. The sensors could include one or more accelerometers for checking to see if the vehicle is upright, operated at a reasonable speed, or on smooth terrain. The sensors could include one or more location or global positioning sensors indicating operation of the recreational vehicle within a specified area. The sensors could include one or more communications interfaces connected to the processor for wirelessly detecting the presence of a cellular phone.

DETAILED DESCRIPTION

I. Helmet

The primary invention is a safety device that helps prevent injury by reminding a user to wear safety gear. For instance, an ATV rider is encouraged to wear safety gear such as a helmet. Many injuries due to accidents while riding an ATV can be prevented if the rider is wearing a helmet. In other embodiments, a jet-ski operator could be encouraged to wear a life vest, or a snowmobile (or a bicycle or off road motorcycle or similar) operator could be encouraged to wear a helmet. For simplicity, we will focus on the ATV operator and the safety helmet, but one of ordinary skill in the art could adapt this description easily to the other human powered or recreational vehicles.

Figure 1:
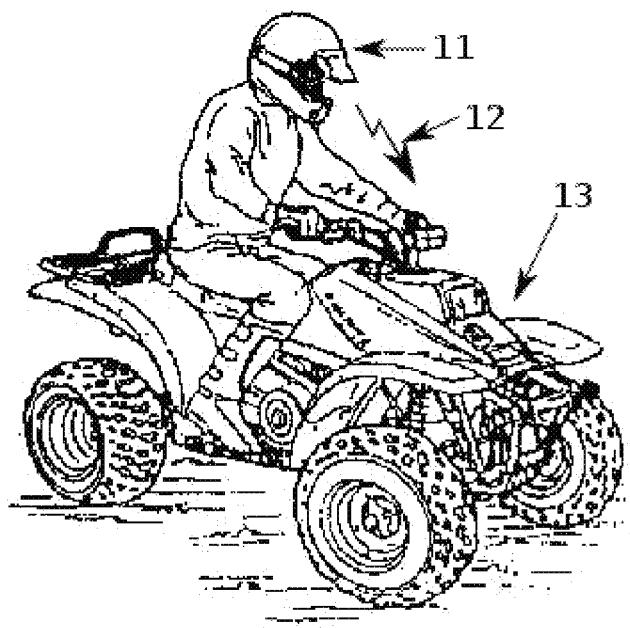
FIG. 1 shows an ATV with a rider and helmet.

This invention proposes a wireless communication link (FIG. 1 item 12) between the helmet (FIG. 1 Item 11) and ATV (FIG. 1 Item 13). The invention utilizes sensors within the helmet, to determine whether or not safety gear is being worn. These sensors are connected to a processor and radio that communicate data wirelessly using the Bluetooth or Bluetooth Low Energy wireless protocol to electronics mounted on the ATV or to a smartphone. Alternatively, WiFi, Zigbee, or other communications links could be used. In an alternative embodiment, the communications link could include a 3G or 4G mobile communications link to a central monitoring location where the helmet data interpreted to see if the vehicle should be disabled or its operation limited. One use for this would be to enforce rules in a race or contest.

In one design, the Cypress PSoC ("Programmable System-on-Chip") could be incorporated into the helmet along with sensors to determine if the helmet is being worn. The PSoC chip includes BLE circuitry and the complete BLE stack, and could be coded with a Bluetooth profile to respond to requests from the ATV electronics with the sensor data that provides the indication of whether the helmet is on the users head. The PSoC, sensors, and a battery could be electrically mounted on a small pc board with a small antenna made of traces etched into the board. An on-off switch is optional to save battery, alternatively, the power save mode on the PSoC could be used to keep the board in a deep sleep mode if the helmet is not in motion.

This board could be shock-mounted into the inside of the helmet to prevent damage from impacts to the helmet. Additionally, the pc board could be coated in epoxy or similar compound to protect the electronics from water, snow, mud, dust, humidity, and other environmental hazards commonly found with ATVs. The temperature in a helmet should be within the operating range of the integrated circuits should the helmet be worn. There is a concern that a helmet left outside in sub-zero weather may not be warm enough to operate, but once the helmet is placed on the user's head for a few minutes, the temperature should return to operating range, provided that the pc board is mounted inside of the helmet.

Figure 2:
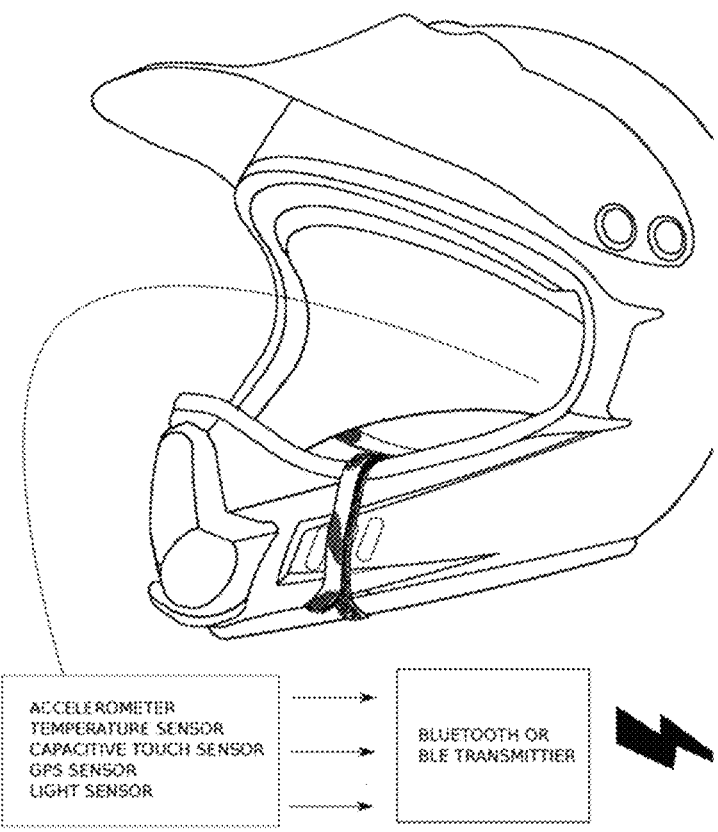
FIG. 2 illustrates a motorcycle helmet with various sensors to determine if the helmet is being worn.

FIG. 2 shows a typical open face ATV helmet. As shown in FIG. 2, the helmet could contain one or more sensors, such as a capacitive touch sensor, an accelerometer, a light meter, a temperature sensor, a GPS sensor and a voltage continuity measurement across the chin strap. The sensors would work together or independently to determine if the rider was wearing a helmet.

The accelerometer could determine if the head is in an upright position and could work in concert with an accelerometer on the vehicle to determine if the vehicle and helmet are in motion together. The three axis accelerometer data for the x, y, and z dimensions could then be checked against a range to determine the orientation of the helmet. Some interpretation of the data is required, so that a rider sitting straight up on the machine is seen as valid, just as the rider who is leaning far forward or deep into a turn is seen as still wearing the helmet. Furthermore, a time delay of 30 seconds or more is needed to account for the rider looking in various directions as they drive.

A capacitive touch sensor could detect contact with, or proximity to, the rider's skin as another method of determining if the rider has a helmet on. An algorithm may read the value of the sensor and, if the value is above a certain range, determine that the helmet is being worn by the rider. One shortcoming of this methodology is interference from clothing such as hats and masks that a user may wear in colder weather. Such clothing may block the capacitive tough sensor from making an accurate reading. A solution is to make the customer set their clothing such that the sensor is not blocked.

If the rider is wearing a hat or face mask then the light sensor would still be an indicator that a helmet was being worn. A design for this sensor is to look for light in the place where the user's head belongs. If there is light, then the helmet is not being worn by the user. One shortcoming of this technique is that a user could defeat this sensor by placing tape over the sensor.

In one embodiment a temperature sensor could be utilized to measure body heat to determine whether or not the helmet is being worn. The temperature sensor could be utilized even if there is a hat or face mask being worn. An algorithm can determine when the temperature within the helmet for a range between 95 and 105 degrees. If the temperature is within this range, the helmet is assumed to be on the head of the rider.

Another sensor could measure voltage continuity to determine if the chin strap is connected and in place. This is a simple wire that loops through the chin strap down to the clasp that hold the chin strap together. If there is continuity in the wire, then the helmet clasp is connected. One shortcoming of this technique is that the clasp can be connected without the helmet being worn. As a result, a combination of this sensor with other sensors is desirable.

Any combination of the sensors could be used to determine if the helmet is being worn by the user.

A PSoC has inputs to handle a large number of sensors, and these sensors could be electrically connected to the PSoC. There would also be a wireless Bluetooth or Bluetooth Low Energy transmitter within the helmet to take the sensor data and transmit it to a receiver located on the vehicle or to a smart phone, as shown in FIG. 2.

In some embodiments, the helmet could also include a speaker that is connected to the PSoC. When the operation of the vehicle is limited, perhaps for unsafe operation, the PSoC would send an audio message to the speaker informing the user why the vehicle's operation is limited.

In some embodiments, the helmet could record the usage parameters of the helmet: when it was used, if it was moving and not one the user's head, angles of the head, impacts and shock forces on the helmet. These parameters could be sent to a cell phone or computer for processing and reporting. Or the helmet itself could create a report that is verbally reported, displayed on a display or heads-up display, files transferred to another device, or provided in a web-site hosted on the helmet.

II. Recreational Vehicle

The signal from the helmet is transmitted to the ATV (or other recreational vehicle) where the data is received and processed to determine if the operation of the vehicle should be limited. In some embodiments, a specific helmet must be paired with the vehicle to assure that a specific user is operating the vehicle. This helps to control who operates the vehicle and may help to prevent theft or unauthorized operation. In other embodiments, any helmet with the proper hardware and software will allow the vehicle to operate with full functionality. In another embodiment, the user's cell phone could be paired with the vehicle to prevent theft. If the vehicle does not detect the user's phone, the vehicle will not be allowed to start, and could operate with restricted functionality if operating without the cell phone.

More generally, owner permission may need to be given via the app in order for normal operations to proceed, or in fact for the vehicle to start. This would be akin to having a password for the vehicle. A key could be left in the vehicle at all times, yet it would be difficult to steal as the app on the owner's cell phone would serve as the key to the vehicle.

In another embodiment, the type of helmet could be used to determine operation parameters. For instance, if a bicycle helmet is being used on an ATV, the ATV may be allowed to operate, but with parameters for low speed, low angle operation. Whereas with a helmet designed for ATVs, full operation of the ATV is allowed.

In addition to a helmet, other protective equipment could be monitored in a similar manner, such as a cell phone, an emergency kit, a chest protector or a proper footwear. The requirements could be based on the weather, date, or trip plan.

In one embodiment, the weather could be checked and monitored as the recreational vehicle is operated. The operation of the recreational vehicle could be limited based on the predicted weather. For instance, if thunderstorms are approaching, a jet ski's operation driving away from the dock could be limited, but full power could be allowed heading back to the dock. This embodiment assumes a GPS module or similar on the recreational vehicle or helmet, so that the location of the recreational vehicle can be determined.

A. After Coil Design

Figure 3:
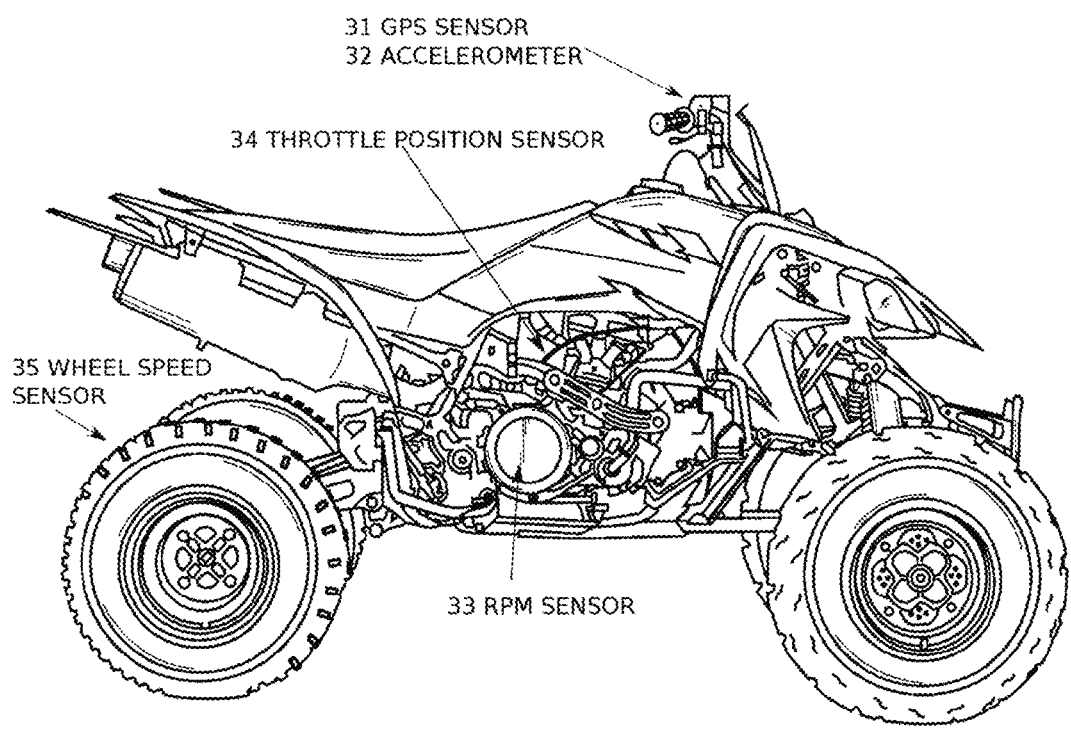
FIG. 3 shows an ATV with various speed related sensors.
Figure 4:
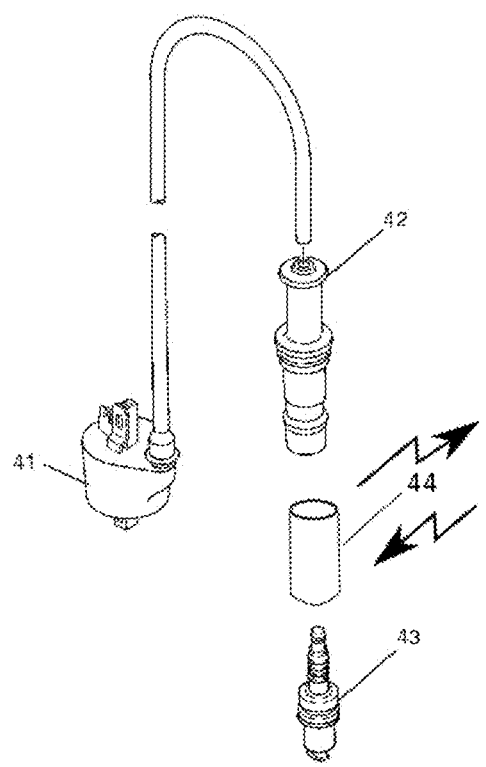
FIG. 4 shows a spark plug wire and spark plug with the ignition limiting device inserted.

As shown in FIG. 3 Sensors on the vehicle could include a GPS sensor (item 31), accelerometer (item 32), an RPM sensor (item 33), a throttle position sensor (item 34), and a wheel speed sensor (item 35). The RPM sensor could be located on the end of the spark plug or in it ignition control module. The RPM sensor could be combined with an RPM limiting device. This could be incorporated in a separate plug-in piece that attaches to the spark plug itself. As shown in FIG. 4 a typical ATV ignition system includes a coil (item 41), a plug wire (item 42) and a spark plug (item 43). Typically the OEM spark plug wire attaches to the spark plug. The RPM sensor/Rev limiter (item 44) could be attached to the end of the spark plug in between plug wire 42 and spark plug 43.

In this design, EMP protection and shielding will be important, as there are high voltages (e.g. 30,000 volts) between the plug wire 42 and the plug 43. A microprocessor with a Bluetooth functionality, such as the Cypress Semiconductor PSoC, will be incorporated in the RPM limiter 44. In addition, the RPM limiter 44 will include an antenna and a relay or a high power transistor for allowing or disallowing the current to flow from the plug wire 42 to the spark plug 43. The PSoC will received the data from the helmet over Bluetooth or BLE. If the helmet is worn, the transistor or relay are set to send all of the current through from the plug wire 42 to the spark plug 43. If the helmet is not detected or if the helmet is not being worn, then the PSoC will allow on a percentage of the spark current pulses to pass through from the plug wire 42 to the spark plug 43 thereby limiting the number of times the engine will fire.

To prevent tampering, the PSoC could record each time the plug wire is disconnected and could attempt to send a message to the owner via text message, phone message, email, Bluetooth message or the like at the time of the disconnect. This would notify the owner of attempts to defeat this feature.

B. Before Coil Design

Figure 5:
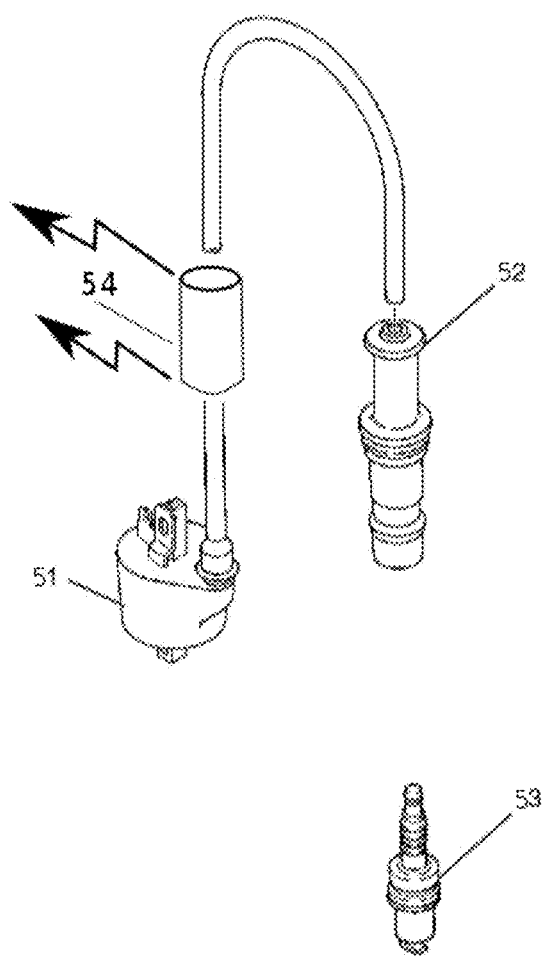
FIG. 5 shows a spark plug wire and spark plug with the ignition limiting device inserted.
Figure 6:
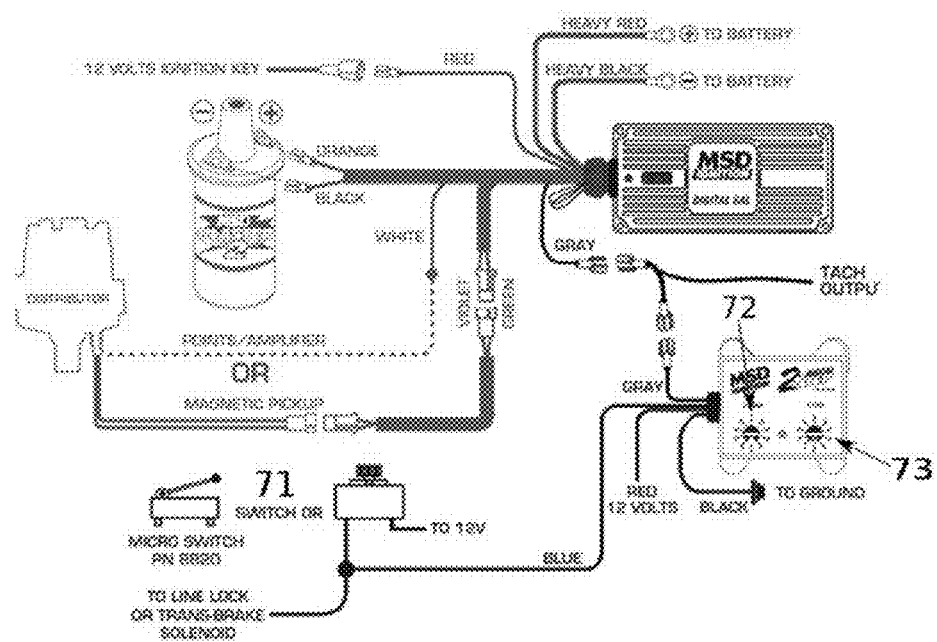
FIG. 6 shows an Electronic Control Unit module with the ignition limiting device.

In FIG. 5, item 51 could be the main computer. In this case the RPM sensor/Rev limiter (item 54) could be inserted between items 51 and item 52. In this Case item 52 would be the ignition coil. The RPM sensor/Rev limiter could be used in determining vehicle or engine speed, and also used in limiting the spark to reduce the vehicle speed. The RPM sensor/Rev limiter would have a Bluetooth or BLE transmitter and receiver (for instance, this could be a Cypress PSoC) incorporated so that it can receive signals in order to limit engine speed and transmit the engine speed data to be used for vehicle control calculations. Limiting the engine speed by interrupting the electrical signal to the spark plug can be done in a number of different ways depending on the type of ignition system. In modern ignition systems, a signal to fire the spark plug is sent from the vehicles main computer. The signal sent from the vehicles computer is usually a low voltage in the vicinity of 12V. This signal is sent to an ignition coil which increases the voltage to upwards of 30,000V. In modern ignition systems the ignition coil is located in line with the spark plug. The spark plug is usually attached directly to the coil. In older systems the high voltage was transmitted from a coil located remotely from the spark plug and required a high voltage wire to transmit the voltage from the coil to the spark plug. In a modern ignition system an electronic RPM limiting device usually uses a circuit which includes a microcontroller to interrupt the low voltage signal before it gets to the high voltage ignition coil. There are a number of current RPM limiters (also known as rev limiters) on the market today such as the MSD Part no 8732 "2 Step Rev control for Digital 6AL". This RPM limiter is commonly known as a 2 step Rev limiter. It limits the RPM at two different set points. The low RPM set point is activated/de-activated by a switch (FIG. 6, item 71). The high RPM set point is set to activate automatically when a certain RPM is reached. Both the high and low RPM levels are set with a dial (items 71 and 72). In our case we could replace the low RPM activation switch (FIG. 6, item 71) with a Cypress PSoC. If the Bluetooth module wirelessly receives data that a helmet is not being worn then, it would send an on or off signal to the MSD Part No 8732. This in turn would activate the low RPM limiter and thus limit the speed of the vehicle. There are a number of different methods the RPM limiter can use to safely limit the speed of the engine. One of the more popular methods is to interrupt the frequency of the signal randomly. The RPM limiter could also receive a signal from a crank position sensor, cam sensor or other engine speed counter.

As an RPM sensor, the device would take each signal to fire the spark plug and transmit this data. The signal would get transmitted to a processing unit or smartphone. The processing unit could then use this signal along with other data (such as a throttle position sensor) to deduce the engine speed. Other locations for the RPM sensor would include the flywheel, flywheel housing, or in line between the vehicle computer and the spark plug. The GPS sensor would determine if the vehicle is moving and could be used in conjunction with a GPS sensor in the helmet to determine if the speed of the helmet and the speed of the vehicle match. The GPS data could also come from a smart phone that is mounted on the vehicle. An accelerometer mounted on the vehicle could be used in conjunction with the helmet mounted accelerometer to determine if the vehicle accelerations match the helmet accelerations. The vehicle mounted accelerometer data could also come from a smart phone that is mounted to the vehicle.

If the vehicle does not have a throttle position sensor, a throttle position sensor could be added to determine the throttle opening. In a preferred embodiment, the mounting position for this would be on the carburetor or throttle body so that it measures the position of the throttle opening directly. Secondarily this could be mounted on the thumb throttle or handlebar twist throttle. It could also be mounted so that it measures the amount of throttle cable that has moved.

Once the combination of sensors determines that a helmet or life jacket, or other safety equipment is not being worn, the vehicle can be disabled in several different ways depending on the type of vehicle. For a motorized vehicle such as an ATV, Dirt Bike, Boat, Jet Ski, or Tractor, the best method is to limit the maximum revolutions per minute the vehicle can obtain. This can be done by limiting the spark plug ignition frequency or limiting the amount of fuel that the vehicle can use. An ignition interrupt module can be attached directly to the spark plug. The spark plug wire that normally attaches to the spark plug can be attached to the end of the ignition interrupt module. The function of the ignition interrupt module would be to interrupt the voltage being sent to the spark plug in a random fashion so that the maximum revolutions per minute of the engine is regulated to a set number. This method would also work for a lawnmower, chainsaw or weed eater (See FIG. 4).

One limitation of this design is that a knowledgeable user could defeat the technique by removing the Rev Limiter and directly connecting the spark plug wire to the spark plug. Defeating the mechanism is much more difficult with the next design.

C. ECU Designs

Another method would be to take the ignition signal output from a vehicles main computer and alter it so that the ignition signal is interrupted therefore keeping the engine from going over a set RPM. An example of this is shown in FIG. 5. item 51 being the vehicles computer, item 52 being the signal interrupter, Item 53 being the voltage coil, and item 54 being the spark plug. Again this is similar to the MSD Part number 8732 system (FIG. 6). The difference in this case being that the signal to tell the rev limiter to turn on could come from a Cypress PSoC.

On some vehicles the RPM is limited by the Engine Control Unit (ECU) itself. See FIG. 7. An example of this is the SAGEM/Johnson Controls MC1000 ECU. This ECU is a programmable ECU that controls both the fuel delivery and ignition. It has inputs for standard sensors such as a coolant temp sensor, throttle position sensor, crank sensor, etc. The ECU also has some extra programmable input lines as well. Typically an end user uses software to program the fuel and ignition. The different fuel and ignition settings at different RPM levels is called a map. Once a user has created a map they are happy with they can connect to the ECU with a computer, laptop, tablet, smartphone or other device via a cable. Once they are connected to the ECU they can then upload the map to the ECU. The map has provisions to utilize the extra input lines to trigger other functions, such as set the max RPM of operation. In our case these input lines could be connected to a Cypress PSoC. The Cypress PSoC could then send the appropriate signal after determining if a helmet is being worn or not. On a vehicle that has fuel injection, the throttle position data could be manipulated before the central computer receives the data from a throttle position sensor. The signal would tell the computer that it is only open a fraction of the amount it actually is. The computer would then only supply a limited amount of fuel therefore reducing the speed of the vehicle. Another way for limiting the fuel would be an electrically, or electromechanically actuated valve that is put on the exit of the fuel tank, or the inlet of the carburetor. This valve can be activated to restrict, or cut off fuel flow to the vehicle. Ideally in these cases the limiting of spark or fuel would be done in a gradual controlled manner so as to not cause a loss of control of the vehicle.

Such tight coupling with the ECU could also provide a mechanism for the ECU to report engine performance issues to the user through the speaker in the helmet. Various error codes could be sent to the helmet for the user to hear so that he could take the machine to a mechanic to repair.

The only way to tamper with this method to defeat the mechanism is to reprogram the ECU. To alert the owner of tampering, the download firmware is modified to attempt to send a text message each time the ECU software is reprogrammed.

D. Other Designs

Additional methods could be used to make riding or driving the vehicle more of an annoyance therefore causing a user to NOT want to drive or ride the vehicle. These could include causing the throttle to become hard to use by adding friction requiring more force to be use to operate the throttle. This could be done by increasing the initial displacement (also known as pre-load) of the spring. The throttle return spring is usually located on the carburetor or throttle body. The throttle usually activates the return spring via a throttle cable. In normal operation there would be a return spring which causes normal throttle operation. A wireless signal could be sent to an electromechanical device to increase the initial displacement of the spring, therefore causing an increased spring force throughout the range of motion. The electromechanical device could consist of a Cypress POC and an electric motor. The motor could, via a linkage change, increase the initial displacement (also known as spring pre-load) of the spring. In the event that the throttle system uses a motor to open and close the throttle body or carburetor, you could use a clutch device at the throttle control itself. The clutch device could be spring loaded such that when engaged, the throttle is hard to turn. When disengaged the throttle has normal operation. This could also make it hard or impossible to shift into another gear in a manual transmission vehicle.

In another embodiment, the brakes on the recreational vehicle could be partially engaged to limit the speed of the vehicle. A description of the use of brakes to limit performance is found below in conjunction with the bicycle embodiment. These techniques could also be used on motorized vehicles.

In a typical scenario, the machine is started and left to warm up for a few minutes. No helmet needs to be present when warming up. In the warmup period, power is supplied to the spark plug device, and the Bluetooth boots up and searches for the helmet. If the helmet is found, full power may be allowed on the machine at any time. If the helmet is missing, operations of the vehicle may be limited.

E. Electric Vehicle

On an electric vehicle you could disable the vehicle by limiting the voltage to the electric motor. This can be done by activating a circuit attached to the same circuit as the throttle potentiometer. This new circuit would increase/decrease the resistance therefore sending a lower or higher voltage signal to the motor controller. The motor controller would then think that the throttle opening is lower than it is, thereby lowering the power output of the motor. You could also employ a circuit breaking technique wherein the power is completely disabled and the motor gets no power at all.

F. Unsafe Operation

In addition to disabling the vehicle due to absence of safety gear, the vehicle could also be disabled due to certain location based or ride characteristic based specifications. For example, if a vehicle being ridden by a child moved too far away from a parent the vehicle could be disabled. This could be done with GPS fences, using GPS signals to determine if the vehicle is within a given area. The geofence could be set as a distance from a specific point, or could be an irregular shaped area based on a map. For instance, a parent could highlight an irregular area on a map interface on a smartphone, the areas specifying where the child could operate the vehicle. Or radio signal strength on BLE, WiFi or other radio signals could be used to determine if the vehicle moves beyond the range of the radio signal. Essentially this is setting a geofence during the course of the trip. The system could use the compass of the smart phone and GPS readings to know what direction the unit was heading at any point in time. If the vehicle turned the wrong way, performance would be modified in order to discourage that direction. Or the performance could be limited for the vehicle as it is leaving the geofenced area, and full performance is allowed as the vehicle returns toward the geofenced area. In one embodiment, the performance is gradually limited as the vehicle approaches the edge of the geofenced area.

In another embodiment, the performance could be limited to enforce a curfew for a child. The parent could set a parameter in a cell phone coupled with the helmet wirelessly, or in the helmet itself, that limited performance of the machine after a certain number of hours of use or after a certain time of day. In a more sophisticated embodiment, the cell phone (or in the helmet) could check with Google maps, or a similar application, to determine the best path home. If the user deviates from the path home, then performance is limited. If the user is traveling towards home, then full performance is allowed.

Perhaps in all these scenarios where engine performance is used as a control means, such engine control could come in a variety of forms. Specifically, the ramp down in speed could change sharply or gradually. It could also be made to be annoying, such as a intermittent interference with speed. The parent could choose from be allowed a large range of limitations on engine performance.

If a vehicle was ridden in an unsafe or "stunt" fashion the vehicle could be disabled. To determine if a vehicle is operated in an unsafe fashion, an accelerometer in the helmet is monitored to determine the amount of motion that helmet is seeing. If he variances from the x, y, or z readings exceed a predetermined level, the vehicle is determined to be operated in an unsafe manner, and the vehicle is disabled or its functionality may be limited. Additionally, various patterns of accelerometer readings could be compared to patterns of unsafe operation and also used to disable or limit functionality of a vehicle. For instance, if the helmet accelerometer readings show that the riders head is at a 60 degree angle to the direction of travel, the vehicle is being operated while leaning excessively into a curve, and thus in an unsafe manner. Excessive speed could also be monitored using the helmet accelerometers. In some embodiments, a parent could set parameters determining what speed, angles taken, jumps, etc determine unsafe operation. In other cases, a standard set of parameters for the particular vehicle could be used.

Terrain could also be a metric used to control speed. If the accelerometer indicated that the ATV was now on a dirt road with bumps, the vehicle could automatically slow down. Alternatively, the parent could be notified and such control could be manually instigated by the parent. In another embodiment, a map could be queried to determine the terrain that the vehicle is approaching, and the power could be limited as the vehicle approaches a hazard. For instance, if the vehicle approaches a narrow steep area of the trail, the power could be throttled back automatically to prevent unsafe operation. In another embodiment, LIDAR, sonar, ultra-sound or infra-red sensors could be used to determine how close obstacles such as trees or rocks are on the trail, and set the vehicle performance based on the narrowness of the trail. These sensors could also be used to prevent accidents with other vehicles.

Tricks and speed could also be programmed to be a function of terrain so that engine performance could be attenuated before reaching such terrain. For instance, all public roads could be programmed to have a maximum speed of 20 mph. Or if there were a known hazard, say a steep slope, on a dirt trail, the speed could be throttled before reaching such a location. A parent could designate such parameters via a map interface, whereby local roads could be assigned speed limits and areas, such as pastures, marked off for special control.

While such controls could be set in place ahead of time, another approach would provide the parent with real time input as to what is happening on the trail due to the connection between the user's smartphone and the owner's. With that capability, the owner could institute such controls in real time as current events became evident. This would require that the vehicle couple with the user's cell phone to allow ride information to be relayed into the cell phone network.

In all cases, it may be advantageous to delay the limitation of functionality or the disabling of the vehicle for 5-10 seconds to allow the user to get out of a tough situation. For instance, if the machine is on a steep slope, it may be best to allow the user to drive off of the slope before limiting the performance of the machine.

Alternatively, if the vehicle is operated in an unsafe manner, the vehicle could provide a report of the unsafe operation to a parent or other responsible person through text message, email, or similar. This report could be sent by connecting to a cell phone of the user and relaying the message through to the cell phone network via an app on the cell phone, or the message could be held in memory on the vehicle until the vehicle came in range of the parent's phone. In addition, information on RPMs, time ridden, time on, GPS coordinates and accelerometer readings could be collected by the phone and stored for later analysis.

The system could also require that the user "submit" a plan in order to ride. This might consist of tracing over an on-screen map or in some other way communicating where the user is going. Perhaps, the system does not allow the vehicle to start or run normally until such plan has been approved by the owner.

The system could also be used in much the same way that child controls are implemented for computers. That is, ATV time, for instance, could be limited to 2 hours a day. On the other hand, getting exercise on a bicycle could be easily tracked, per person, by this system. "Points" could awarded and exchanged for "screen time" on a child's computer or phone. Or the points could be used to expand a geofenced area or to allow time outside of the geofenced area. Or to allow additional time using the vehicle.

Riding style could also be discerned by the system. For some activities like dirt biking, the system could provide advice on the proper cornering techniques required at certain speeds and conditions.

In still another embodiment, the helmet could network with other helmets for other users. The user could configure the helmet, indicating that today's ride would be with a group of others. Then, using RSSI and GPS information, a user could determine if the entire group were still together. When leading a group of ATVs (or bicycles or snowmobiles) down a narrow trail, it is difficult to see if the last riders have fallen behind. Using RSSI and GPS, the helmet could notify the user when members of the group fall behind. In one embodiment, the helmet could also be configured with a microphone to allow the users to talk, so if one fell behind, a conversation could be started to slow down the lead riders.

In another embodiment, the network of helmets could communicate with other groups to receive notification of an approaching group. When snowmobiling on a narrow trail, often the lead snowmobiles are surprised when another group comes towards them in the opposite direction. With the network of helmets, as soon as the Bluetooth network notices another helmet approaching, the user could be notified along and a count of the number of vehicles in each group could be exchanged. In another embodiment, the helmet could have a directional microphone looking forward with noise-canceling features to exclude the sound of the group's snowmobiles. This would allow the snowmobilers to hear the sound of another approaching group of snowmobilers.

H. Fuel Monitoring

Running out of gas on a trip is always a concern, and many users often forget to check the tank before leaving. One embodiment of the system could supply the system with the fuel level. If low, the vehicle could not travel so far as to not get back. Or a warning could be communicated to the user via cellphone as perhaps the ATV or snowmobile is going to be going past a gas station. Such gas stations, however, might be known to the app and considered as a reason to warn the user in a different fashion—that is, to fill up at the next upcoming station. The same type of algorithm could be implemented for other vehicle functions such as oil and other fluid levels.

If there was not a direct information feed to the system, perhaps gas usage could be deduced. The system could readily track sparkplug ignites and thus could approximate gas usage. The challenge would be in determining the starting level of fuel.

One way to implement this might be to have the user communicate that to the system. This could be done via the app. Or more easily, the accelerometer could be programmed to accept "vibrational" information or commands. For instance, each time a user filled the gas tank, a user could tap on the hood (or some location where the accelerometer would sense it) three times fast, to indicate that the tank had just been filled thus providing a starting fill level for the system.

If a fuel warning were to be issued and it was in error, the user could recalibrate the virtual gas gauge via the app. Or perhaps a tap sequence could do the job.

III. Bicycle

On a bicycle, or other human powered vehicles, once the combination of sensors detects a helmet is not being worn then the method of disabling a vehicle would include, increasing pedal resistance, disabling pedaling, increasing turning resistance, disabling turning, disabling wheel rotation, or increasing resistance to wheel rotation. In each of these instances a wireless signal would be sent from a helmet to the bicycle. The receiving unit on the bicycle would send a signal to a solenoid, electric motor, or other electromechanical device. The signal from the helmet would be received by the Bluetooth module on a microprocessor, such as the Cypress Semiconductor PSoC. If the chip receives the signal from the helmet, and the helmet indicates that it is being worn, then the bicycle operates as normal. If the signal from the helmet is missing or if the helmet is not being worn, then the PSoC will send a signal to a device to limit functionality. The electrical power for the PSoC and the mechanisms could come from a battery and/or a generator on the wheels of the bicycle.

Figure 7:
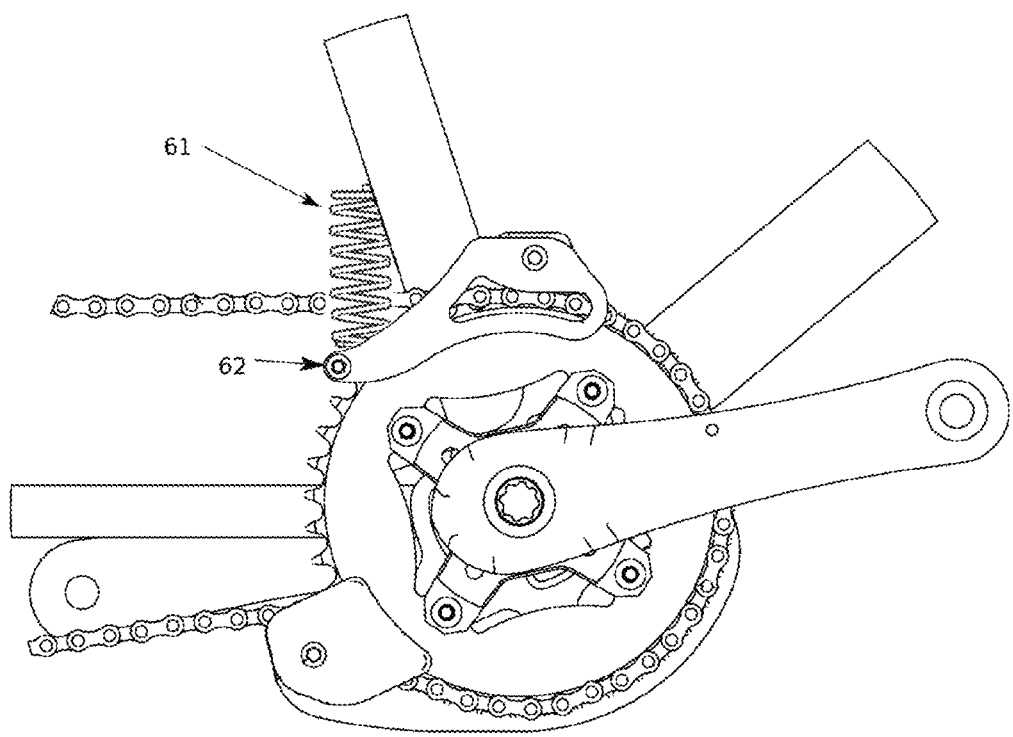
FIG. 7 illustrates the front gear for a bicycle with the mechanism for limiting performance.

Increasing pedaling resistance could be done by increasing resistance on sprocket guide wheel that rolls with the chain. This could be done via a spring loaded clutch. In its resting state the clutch springs are held back by a pin. A solenoid could retract the pin thereby causing the clutch to activate causing resistance. As the resistance is increased on the guide wheel, it would make it harder to pedal. With bicycles that use electronic shifting, the electronics are modified to check for the presence of the helmet, and if the helmet is not present, then the shifting is limited to allow only the lowest of gears. Another version of this could be to have a spring (FIG. 7 Item 61) that is attached to a plastic block (FIG. 7, Item 62). The spring, once activated would force the block against the chain to create resistance on the chain. This would in turn make it harder to pedal. Adding resistance to pedaling is ideal because it still allows back pedaling to engage a coaster brake. To disable pedaling there could be a spring loaded pin that would engage a hole or slot in the front sprocket. Once the pin is inserted into the hole or slot in the front sprocket it would prevent the front sprocket from turning. Ideally the pin would engage in a slot because this would still enable braking to occur by continuing to pedal, then back pedaling to use a coaster brake.

Another way to disable the use of a bicycle is to prohibit the bicycle from turning. This could be done with an arm attached to the bicycle fork and another arm attached to the bicycle frame. Then a spring loaded pin on the arm on the frame would engage the arm attached to the fork. This would lock the steering. This is not ideal as it could cause loss of control of the bicycle. You could also create a clutch mechanism to cause the steering to become hard to do. You could again have a plate attached to the bicycle fork and another one attached to the frame. The one attached to the frame would have a friction compound on it. The friction side, when activated would engage the plate on the fork side effectively creating a clutch to increase steering friction.

To disable the wheels you could simply bolt a plate to either side of the rim with holes in it. Then on the frame you could mount a spring loaded pin. When activated the spring loaded pin would engage the holes on the plate in order to stop the wheel rotation.

Figure 8:
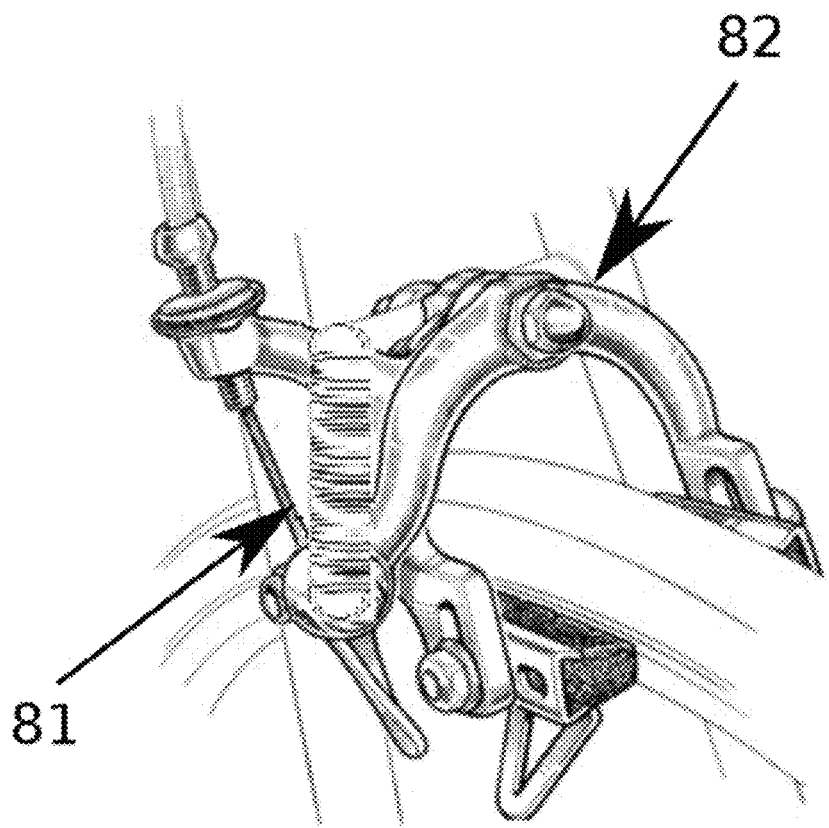
FIG. 8 illustrates the brake for a bicycle with the mechanism for limiting performance.

To increase the resistance on the wheel you could use the brakes already installed on the vehicle and engage the brakes so that it is hard to turn the wheels FIG. 8 shows a system in which a tension spring (item 81) is added to the normal rim braking system (item 82). This spring could be activated by an electromechanical device. Once activated the spring may have to be reset by hand. In the case of a child's bike. The child would have to ask a parent to reset the device. This would be a good way of letting a parent know that the child tried to ride the bicycle without a helmet.

In an OEM version of this invention, a brake type mechanism could be installed in the hub of the front or rear wheel, or on the pedal shaft (the shaft through the pedal housing with pedals on either side). For example, in the case where the brake mechanism is installed on the pedal shaft, the housing around the pedal shaft would have a set of small brake pads that are normally kept away from the pedal shaft. Should the PSoC determine that the helmet is not worn, the brake pads would compress around the shaft, making pedaling difficult but not impossible. The brake pads would compress based on an electrical signal from the PSoC, perhaps causing an electromagnet to pull the pads against the shaft.

There are at least two methods for preventing the tampering with the mechanism that limits functionality of the bicycle (or skateboard, scooter, or other recreational vehicle). The first is to build the functionality limiting mechanism into the frame of the bicycle so that it is mechanically very difficult to remove. For instance, the electronics could be inserted into the frame or into the center of the wheel hub. By making the mechanism small and protected, either location would require damaging the bicycle to remove the mechanism.

Another method is to add a switch to the mechanism that senses when the mechanism is removed. This would be a simple pressure switch that is released when the mechanism is removed from the bicycle. Or the mechanism could be held onto the bicycle with a strap that conducts electricity such that braking the strap causes a signal to be detected by the mechanism. Since the mechanism may have a battery or a capacitor sufficient for operating when removed, there should be sufficient power to operate after removal. If it is removed, then the processor in the mechanism will try to send a text message to the owner through a communications interface. In one embodiment, the PSOC processor could send a Bluetooth message to a nearby cell phone for forwarding as a text message on a cellular network.

In one embodiment, the functionality limiting mechanism is normally paired with two sets of Bluetooth devices, one for a parent or owner of the device (this could be several parents or owners) and the other for a child or user (again, this could be multiple children or users). The owner class would have programming capabilities, allowing limitations on use to be set (speed, location of operation, notification text phone numbers, etc.). The owner class is also notified if tampering with the device is detected. This could be done through a text message (to each owner) or through a message stored in the mechanism until the mechanism is able to pair with an owner. If the owner class does not pair with the mechanism every day (or for a period specified in the parameters), then an app on the owner's phone that relates to the mechanism will notify the owner that the mechanism is missing. The user class passes messages from Bluetooth to the cellular network and passes location information between the user's cell phone and the mechanism.

In another embodiment, the bicycle could report usage of the bicycle without a helmet to a parent in the manner described above. And the tests described above to determine unsafe operation could also be used with a bicycle. Additionally, an accelerometer or other sensors, in the bicycle could determine if the bicycle was left standing on its kickstand, or using a GPS determine if the bicycle were properly put away in the garage, and reported to a parent if not.

IV. Skateboards and Scooters

On a skateboard or scooter, a similar mechanism could be used to use existing brake systems to limit, but not prevent, the turning of the wheels when a helmet is not present. Using the skateboard's (or scooter's) hand or foot brake, an electromagnet could be integrated into the hand or foot brake to partially engage the brake system when a helmet is not present, thereby limiting the speed of the skateboard (or scooter) when safety equipment is missing. The electromagnet could be controlled by a PSOC controller that communicates with the helmet. Power could be taken from the spinning of the wheels or from a battery. In an alternate design, the brake could be engaged by default, and the electromagnet used to allow the wheels to roll freely when the helmet is present. It is envisioned that software would be used to slowly apply the brakes in a situation where the helmet is lost while the skateboard is moving, so that the user does not lose control if the helmet falls off.

Alternatively, a pin could be sent through at least one wheel of the skateboard if the helmet is not present (and the wheels are not turning). When the helmet returns to the proximity of the skateboard, the skateboard will detect the wireless signal from the helmet, and will retract the pin, using an electromagnet. In addition to requiring a helmet to use the skateboard, this also provide a theft deterrent, as the skateboard cannot be operated until accompanied by the helmet.

In another embodiment, the user could control the brakes from buttons on the helmet. If the user wanted to slow down the skateboard, a capacitive or variable resister type sensor could be used to sense the user's hand on the area of the helmet designated to control the brakes. As the user pushes harder, or pushes in a pre-determined direction, the brakes described above would restrict the turning of the wheels. This allows the user to control the brakes of the skateboard without changing his balance.

In another embodiment, a hand-held wireless or wired brake controller could be held by the user, and used to control the brakes. In this embodiment, failure to communicate with the handheld controller could force the brakes on so that a communications failure did not create a situation where the brakes did not function. This hand-held controller could also communicate with the helmet to make sure that the safety equipment is present.

On skateboards without built-in brakes, one axle with wheels could be replaced with an axle containing a Bluetooth connected system that limits the speed at which the wheels turn when a helmet is not present.

V. Other Devices and Vehicles

The techniques described here could easily be adapted to on and off road motorcycles, UTVs (utility task vehicle), snowmobiles, kayaks, motor boats, tractors, go carts, lawn tractors, dune buggies, golf carts, and other vehicles. Other machines that this could apply to include trucks, fork lifts, and other industrial devices.

For downhill skis, the bindings used to attach ski boots to the skis incorporates a mechanism that is activated when the user snaps the boots into the bindings. The binding mechanism includes a Bluetooth (or RFID, WiFi, or other network) communications module that looks to see if the users helmet is proximate. If the communications module connects to the helmet, then the bindings will lock in place. If not, the binding will not latch the boots into the skis, preventing the user from skiing without the helmet. This mechanism also prevents a thief from stealing the skis without also taking the helmet.

In addition, this invention could be used to enforce the use of goggles in a saw mill. The accelerometer on the goggles could be used to determine if the goggles were vertical on the users face when the mill is in operation. Alternatively, a capacitive sensor could be incorporated in the nose pads or temples of the goggles to determine if the goggles were in contact with the user's skin. Also, it could be used to make sure gloves are being worn when operating a band saw, by using a thermal or capacitive sensor to see if the gloves are on the hands. In both cases, the machine checks to see if the gloves or goggles are present and being worn, and if so, allows the machine to operate. Otherwise, the machine will not start operation.

The safety controls described could also be used with a chain saw or like power tools, making sure that chaps and protective clothing are worn, or a weed wacker or lawn mower, checking for hearing protection. In one embodiment, when using a chain saw or similar power tool, the chain saw or power equipment could check to see if the user's cell phone is present. If not, the tool will not operate. This will both prevent theft and make sure that the user has a phone to call for help in case of an accident.

In this embodiment, when the user buys the chain saw, the user downloads an app to his cell phone. The app pairs with the chain saw and displays a set of menus for the user to configure the chain saw. One of these menus may allow the user to set a password that must be entered before allowing the chain saw to pair with another cell phone. In addition the app could display operations data for the chain saw. Such data could include who was apparently operating the saw (accelerometer data for saw and phone would be similar and RSSI could deduce who was closest to the saw), how many hours it was operated for, how many breaks were taken, and what characteristic motions were made with the saw. Somebody's technique could be ascertained in much the same way we discussed monitoring the technique of dirt bike riders earlier. In addition, service reminders for oil changes, chain sharpening, and tune-ups could also be displayed.

In another embodiment, the techniques described in this application could be used to assure that roofers, tree workers, carpenters, painters, and others who work high above the ground are properly tied into a fall prevention system. The equipment used by these workers could be disabled until the fall protection system was properly attached to the worker.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A recreational vehicle safety apparatus comprising:
a motor for propelling the recreational vehicle forward;
a power limiting device connected to the motor, where the power limiting device limits speed of the motor, but does not stop the motor;
one or more sensors for monitoring operation of the recreational vehicle; and
a processor connected to the one or more sensors and to the power limiting device, the processor configured to disable the power limiting device when data from the one or more sensors indicates the recreational vehicle is not in an unsafe operation.

2. The recreational vehicle safety apparatus of claim 1 wherein the one or more sensors includes one or more accelerometers.

3. The recreational vehicle safety apparatus of claim 2 wherein the data from the one or more accelerometers indicates operation of the recreational vehicle at an angle close to vertical.

4. The recreational vehicle safety apparatus of claim 2 wherein the data from the one or more accelerometers indicates operation of the recreational vehicle at a low speed.

5. The recreational vehicle safety apparatus of claim 2 wherein the data from the one or more accelerometers indicates operation of the recreational vehicle on smooth terrain.

6. The recreational vehicle safety apparatus of claim 1 wherein the one or more sensors includes one or more location or global positioning sensors.

7. The recreational vehicle safety apparatus of claim 6 wherein the data from the one or more location or global positioning sensors indicates operation of the recreational vehicle within a specified area.

8. The recreational vehicle safety apparatus of claim 1 wherein the one or more sensors includes one or more communications interfaces connected to the processor for wirelessly detecting the presence of a cellular phone.

9. The recreational vehicle safety apparatus of claim 1 wherein the recreational vehicle is an all-terrain vehicle.

10. The recreational vehicle safety apparatus of claim 1 wherein the recreational vehicle is a motorcycle.

11. A method for limiting the functionality of a recreational vehicle when operated unsafely, the method comprising:
limiting the functionality of the recreational vehicle by activating a power limiting feature connected to a motor that is used to propel the recreational vehicle forward, where the power limiting feature limits speed of the motor, but does not stop the motor;
monitoring the operation of the recreational vehicle by reading data from one or more sensors;
converting data into a signal to the power limiting feature on the motor and;
disabling the power limiting feature of the motor when the signal is received.

12. The method of claim 11 wherein the one or more sensors include one or more accelerometers.

13. The method of claim 12 wherein the data from the one or more accelerometers indicates operation of the recreational vehicle at an angle close to vertical.

14. The method of claim 12 wherein the data from the one or more accelerometers indicates operation of the recreational vehicle at a low speed.

15. The method of claim 12 wherein the data from the one or more accelerometers indicates operation of the recreational vehicle on smooth terrain.

16. The method of claim 11 wherein the one or more sensors includes one or more location or global positioning sensors.

17. The method of claim 16 wherein the data from the one or more location or global positioning sensors indicates operation of the recreational vehicle within a specified area.

18. The method of claim 11 wherein the one or more sensors includes one or more communications interfaces, connected to the processor, for wirelessly detecting the presence of a cellular phone.

19. The method of claim 11 wherein the recreational vehicle is an all-terrain vehicle.

20. The method of claim 11 wherein the recreational vehicle is a motorcycle.

* * * * *